Patented Aug. 24, 1926.

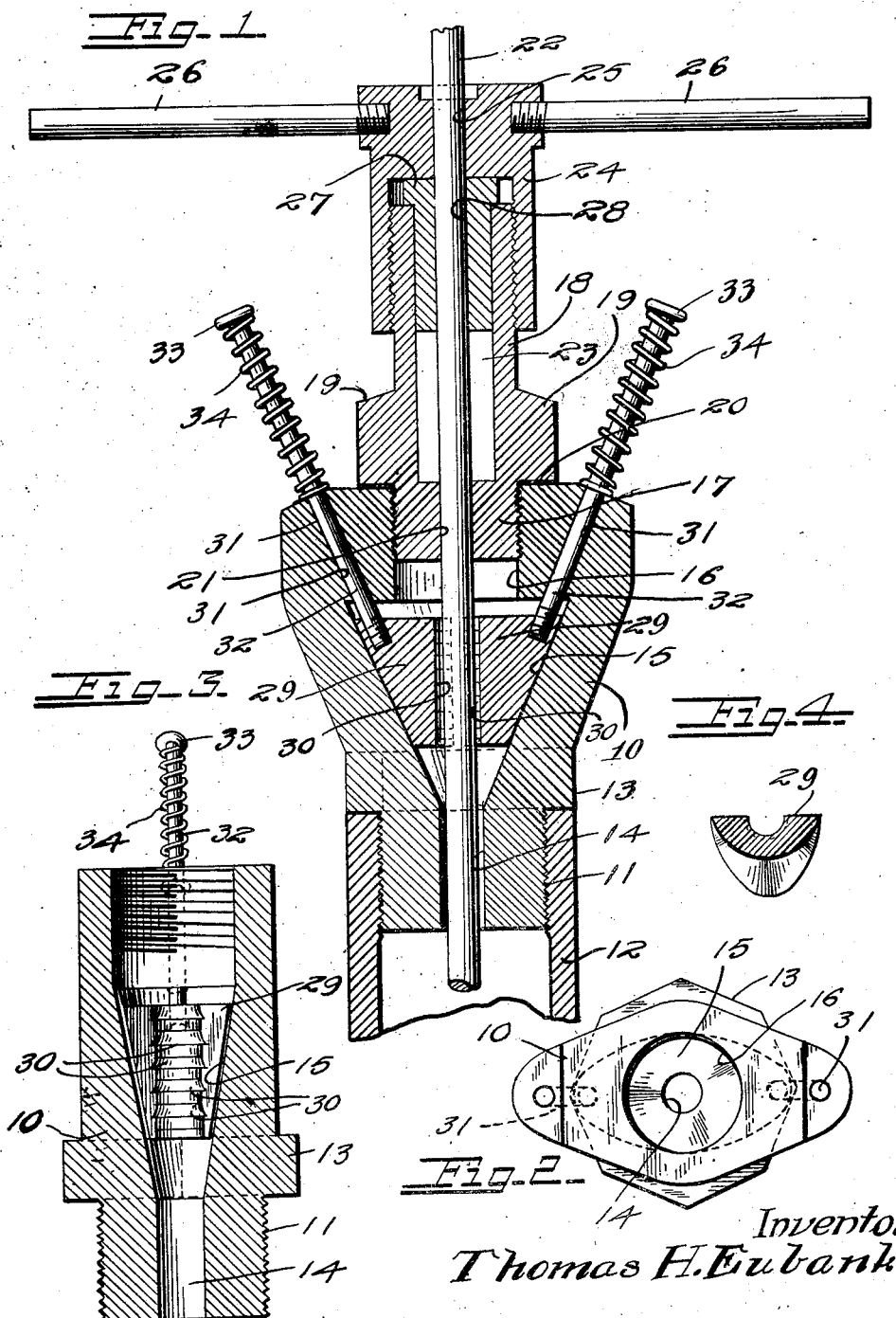

1,597,071

UNITED STATES PATENT OFFICE.

THOMAS HARDY EUBANKS, OF MEXIA, TEXAS.

COMBINED PACKING GLAND AND CLAMP FOR POLISH RODS.

Application filed May 15, 1926. Serial No. 109,445.

This invention relates to a combined packing gland and clamp for polish rods of oil well apparatus.

An important object of the invention is to provide a device of this character combining in a single structure a mounting for the necessary packing gland provided at the upper end of oil well tubing through which the polish rod extends and a means for supporting the polish rods during a pulling operation or when, for any other reason, the polish rods have been disconnected from the operating support thereof.

A further object of the invention is to provide a device of this character having a clamp which is normally inoperative but which may be readily shifted to the operative position when for any reason it is needed.

These and other objects I attain by the construction shown in the accompanying drawings, wherein for the purpose of illustration is shown a preferred embodiment of my invention and wherein:—

Figure 1 is a vertical sectional view through a combined clamp and stuffing box for sucker rods constructed in accordance with my invention;

Figure 2 is a plan view of the clamp section;

Figure 3 is a section taken through the clamp at right angles to the view shown in Figure 1;

Figure 4 is a sectional view taken through one of the slips.

Referring now more particularly to the drawings, the numeral 10 generally designates a body having a threaded lower end 11 for engagement in either the upper end of oil well tubing or a casing head 12. The body upon its exterior is provided with squares 13, by means of which it may be rotated into position. This body is provided with a bore 14 which, intermediate its ends, has a conical enlargement 15, the walls of which are tapered, so that they diverge upwardly. From the upper end of the enlargement extends a bore 16 co-axial with the bore 12 and of less diameter than the extreme diameter of the upper end of the enlargement 15 which is substantially oval in cross section. The bore 16 has its upper end screw-threaded for the reception of the screw-threaded lower end 17 of a stuffing box 18. Adjacent its lower end, this stuffing box is provided with an enlarged portion having squares 19, the lower surface of which serves as a means for clamping against the upper end of the body 10 a gasket 20 which provides a seal between the packing gland and the body. The packing gland 18 at its lower end has a bore 21 slidably receiving the sucker rod 22, this bore enlarging to provide about the sucker rod a packing space 23. The upper end of the gland 18 is exteriorly screw-threaded for coaction with a cap 24 having a bore 25 slidably receiving the sucker rod and having handles 26 whereby it may be rotated. The inner face of the top of the cap abuts a packing follower 27 which slidably fits within the enlarged bore of the packing gland and has a bore 28 slidably receiving the rod 22.

Within the enlargement 15 of the bore are disposed a pair of slips 29, each of such size that when they are located at the upper end of the bore 15, their toothed or clamping faces 30 are well spaced from the rod 22. Downwardly slanting openings 31 are formed through the body from the upper end wall of the bore 15 to the upper end of the body 10. Slidable within these openings are rods 32, the lower ends of which are threaded into the associated slips 29 and the upper ends of which are provided with heads 33 between which and the upper surface of the body 10 extends springs 34 which are coiled about the rods 32 and are of sufficient strength to maintain the slips 29 in their withdrawn position.

In the use of the device and during ordinary operation of the polish rod, the slips are held out of engagement with the rod, so that they do not cause any damage thereto. When, however, it is necessary for any reason to disconnect the rod from its operating support (not shown), the slips may be forced inwardly against the springs 34 until they engage the rod and the rod disengaged from its support. As the slips will then take the weight of the rod, the springs 34 will be insufficient to cause the slips to be withdrawn. Immediately, however, the rod is engaged with its support and elevated a very slight distance, these springs will automatically return the slips to their normal position. This renders the device particularly useful in adjusting the temper screw or slack take-up devices of the rod which must ordinarily be taken up against the weight of the rod and further provides an efficient means for supporting the rods during withdrawal or installation thereof. Since the slips do not combine in circular form, it will be obvious that these slips will provide a means for holding rods not only against downward displacement, but also against rotation, thus further assisting in the operation of inserting or removing the rods in the well. It will, of course, be obvious that during either of these latter named operations, it will be necessary to remove the stuffing box 18 until the operation is completed.

Since the construction hereinbefore set forth is obviously capable of a certain range of change and modification without materially departing from the spirit of the invention and I accordingly do not limit myself to such specific structure except as hereinafter claimed.

I claim:—

A sucker rod clamp comprising a body adapted at its lower end for engagement in an opening provided in a casing head or the like, the body having a bore opening through its lower end, the upper end of the bore communicating with an enlargement thereof providing diametrically opposed upwardly diverging walls, slips arranged within the enlargement and slidable upon said walls, means including a part extending through the body and engaging said slips for normally maintaining the slips at the upper ends of said walls, said slips having rod engaging faces which, when the slips are in the last named position, are spaced apart a distance greater than the diameter of the rod with which they are to coact, said means comprising bars slidably directed through upwardly diverging openings formed in the body and having their lower ends secured to said slips, the upper ends of the bars having heads and springs surrounding said bars between the heads thereof and the opposed faces of the body, said bars maintaining the outer faces of said slips constantly engaging with the divergent walls of the enlarged portion of the bore, the upper end of the body having a threaded opening of less size than the distance between the upper ends of said diverging walls.

In testimony whereof I hereunto affix my signature.

THOMAS HARDY EUBANKS.